Figure 1:
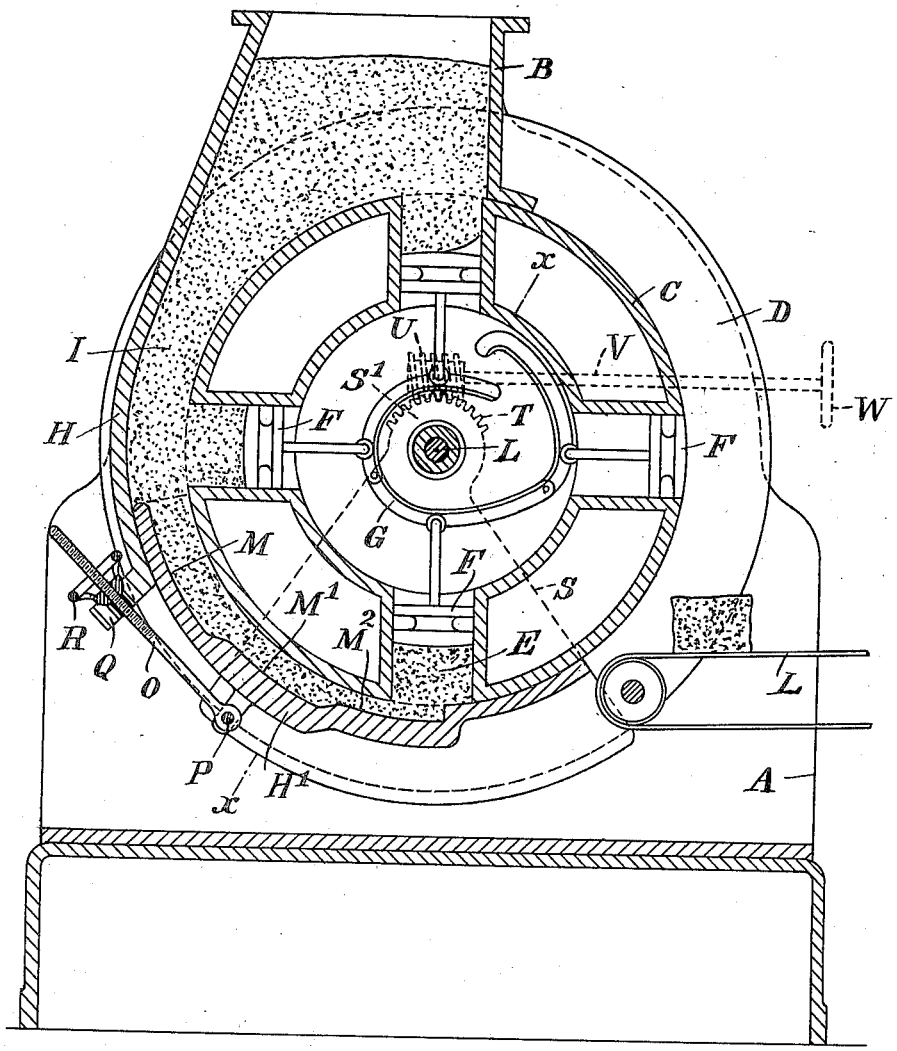

J. & H. L. CALLOW.
APPARATUS FOR DIVIDING AND MOLDING DOUGH AND OTHER PLASTIC MATERIAL.
APPLICATION FILED JULY 29, 1911.

1,088,532.

Patented Feb. 24, 1914.

J. & H. L. CALLOW.
APPARATUS FOR DIVIDING AND MOLDING DOUGH AND OTHER PLASTIC MATERIAL.
APPLICATION FILED JULY 29, 1911.

1,088,532.

Patented Feb. 24, 1914.

2 SHEETS—SHEET 2.

Fig. 1ª

Witnesses
Albert Popkins
Geo. E. Evans

Inventors
John Callow
Herschel L. Callow
By Sturtevant & Mason
Attorneys

UNITED STATES PATENT OFFICE.

JOHN CALLOW AND HERSCHEL LIVINGSTONE CALLOW, OF LIVERPOOL, ENGLAND.

APPARATUS FOR DIVIDING AND MOLDING DOUGH AND OTHER PLASTIC MATERIAL.

1,088,532.      Specification of Letters Patent.      Patented Feb. 24, 1914.

Application filed July 29, 1911. Serial No. 641,256.

*To all whom it may concern:*

Be it known that we, JOHN CALLOW and HERSCHEL LIVINGSTONE CALLOW, subjects of the King of Great Britain, residing in Liverpool, in the county of Lancaster, in the Kingdom of England, have invented certain new and useful Improvements in Apparatus for Dividing and Molding Dough and other Plastic Material, of which the following is a specification.

This invention has for its object certain improvements in the apparatus for dividing dough and other plastic material described in the specification of patent application Serial No. 519,870, filed September 22, 1909. In that specification, a concentric space or charging chamber extends part way around the drum, which coöperates with the hopper and drum to feed the dough into the receivers or cells. This space or charging chamber extends around the drum about a fourth part of its periphery, and a valve or presser member is provided therein so arranged and operating, as to allow the dough to be carried forward by the drum when the drum rotates, but at intervals to close and impose a definite pressure on the dough to force it into the cells.

Now by the present invention this valve or presser member for imposing a pressure on the dough in the cells is dispensed with, and the rotation of the drum in conjunction with the opposing wall of the charging chamber, is relied on to force the increments of dough downward and pack them into the cells. For this purpose the charging chamber which is made concentric, extends as far around the drum as may be required to produce the necessary pressure to fill the cells, the dough being long enough in frictional contact with the drum for the rotation of the latter to force increments of dough downward from the hopper, and crowd or pack the dough into the bottom of the chamber, so that the cells when they get to or near the bottom, become filled or packed with charges of like weight and size. The charging chamber is either of uniform area throughout, or the wall thereof approaches nearer to the drum in one or more steps, so that the dough is subjected to greater pressure, as it gets nearer the end of the chamber.

The invention will be understood from the following description, reference being had to the accompanying drawings, in which—

Figure 2:
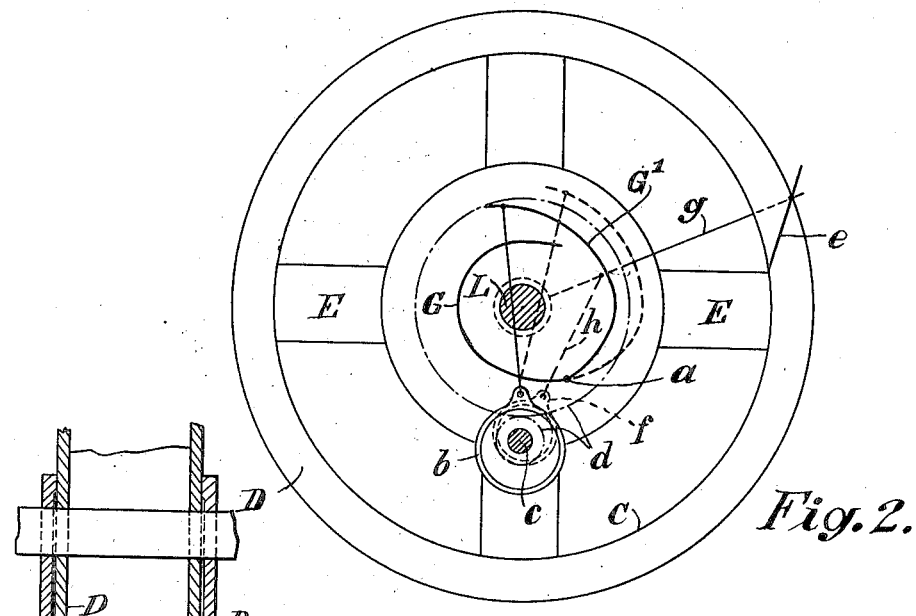
Figure 3:
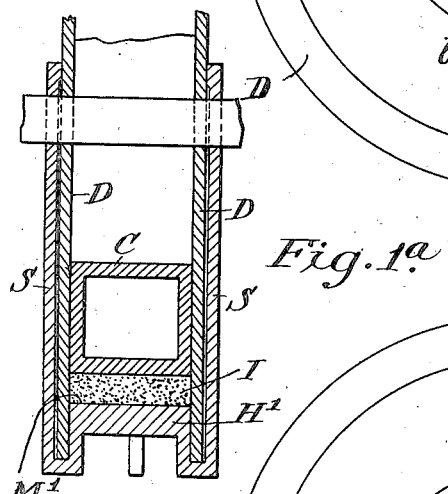
Figure 3:
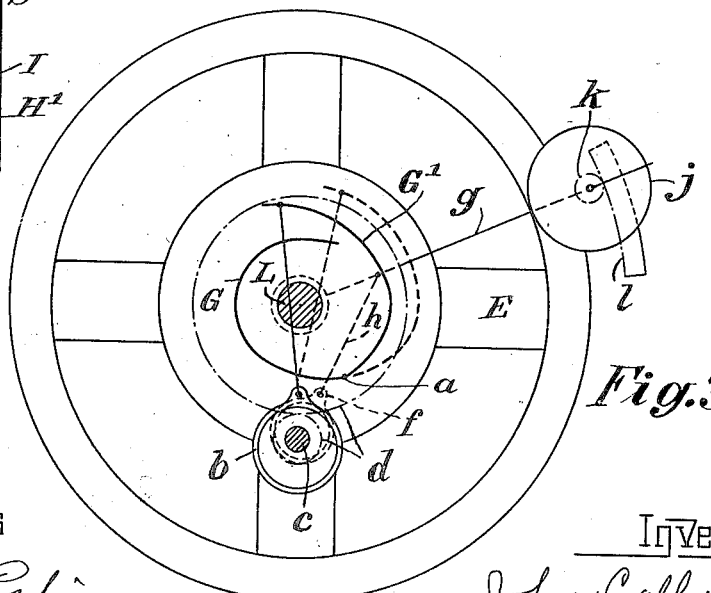

Figure 1 is a vertical section of the machine showing the wall of the charging chamber approaching near to the drum in steps; Fig. 1ª, a fragmentary cross section on line *x x* of Fig. 1; Figs. 2 and 3 diagrammatic views of means for positively removing the extruded dough, and thereby securing a uniform spacing on the delivery belt.

In Fig. 1 of this drawing, A is the machine frame, B the hopper for the reception of the dough, C the drum having side flanges D, and provided with cells E for the reception of the charges of dough, which cells may be of any desired form. Each cell E has the usual plunger F conforming to the shape of the cell, and operated by a cam device G to control the movement and adjust their position. The hopper B at one side is extended downward so as to form a curved plate H which extends part way around the drum and is spaced concentrically the desired distance therefrom so as to form a passage way I for the dough which is placed in the hopper B, and which is rolled out or reduced in the passage way I and forced downward by the rotation of the drum C. The extension H of the hopper is of such width as to fit snugly between the side flanges D of the drum, and the extension H, drum C and the side flanges D form a concentric passage way I. The flanges D carry the drum C and said flanges are keyed or otherwise secured on the shaft L. The bottom J of the concentric extension piece H bends inward and bears against the drum periphery, so that it snugly fits against it, and acts in conjunction with the drum to cut off the dough at J' if required. Just before this, the concentric extension piece H is spaced at *h* nearer to the drum, so that the passage way at the bottom is of smaller area than for the remainder of its length, and forms a throat K. The flanges may be dispensed with if desired.

In the operation of our improved machine a mass of dough is placed in the hopper B and the drum C is set into motion by rotating the shaft L. This rotation of the drum forces increments of dough down into the passage way I from the hopper B, the dough being rolled and attenuated between it and the extension piece H, and so is carried downward and enters the bottom of the passage way, which it fills and is packed or crowded therein. The successive charges of the dough force back the plungers F in the cells E as far as permitted by the cam device G which has been adjusted to limit the retreat of the plungers F, so that each will permit only an exact regulatable amount of dough to enter the cells, and charges of like weight and size are formed. As the drum rotates, carrying down fresh increments of dough, the dough is forced into and packed tightly in the cells E, and the charges are divided from the mass in the passage way by the cutting edge J. The cam now gradually forces the plungers outward, and then expels the charges on to the conveyer L. It will thus be seen that the dough is advanced along the passage way I (which is concentric with the drum) by the rotation of the drum, which is in frictional contact with the dough, and the dough is so crowded or packed in the bottom of the passage way that the cells as they get to the bottom, become packed with charges of like weight and size. The object of reducing the passage way into a throat K at the bottom closed at the end, is to help to cause the dough to be packed or crowded at the place where greatest pressure is required, and to coöperate with the drum to force the dough into the cells. This throat may, however, be omitted if desired.

The wall H of the concentric charging chamber I draws near to the drum in one, two or more steps, M, M', M², so that the dough is subjected to greater pressure as it gets nearer one end of the chamber I and is thereby forced into the cavities E.

Near the hopper B the chamber I attains its maximum area, while a little farther on at M, the wall H is spaced nearer to the drum C so that the area is decreased, then, if desired, a little farther on at M², the wall H is still nearer to the drum C, so that the area is further decreased, and so on, while at the extreme end the chamber is closed. The wall H in fact forms a series of concentric curves which draw nearer to the drum in steps, that is each concentric curve is more contiguous to the drum than the preceding one.

By the present invention also, I propose to lengthen or shorten the charging chamber I so as to make it extend around the drum as far as required, and enable such lengthening and shortening to be adjusted to suit the various classes of dough to be operated upon. To enable this to be effected, the extension wall of the hopper which forms the chamber I around the drum, is made in sections or segments. The hopper at one side is extended downward a short way so as to form a curved plate H, which extends a short way around the drum and is spaced at the desired distance therefrom so as to form a passage way I for the dough which is placed in the hopper B, and which is pressed into the passage way and forced downward by the rotation of the drum C. This extension H forms the first section or segment. Then near the end of this extension another segment or section H' begins spaced nearer to, or the same distance from the drum, the adjacent ends of the sections or segments H H' fitting together or over one another. Then farther on there may be a third segment and so on as many as required. The section or segment H' is arranged to slide telescopically in the curved extension plate or segment H and is supported in contact with the drum by having wing pieces S at the sides, which are mounted axially on the shaft L, so that the segment H' will turn in the arc of a circle concentric with the drum C. In the embodiment shown in the figures, these wings S are in one piece with the segment H' for which purpose they lap over the drum flanges D.

O is a screw spindle hinged at P to the segment H'. This spindle passes through a hole in a flange Q projecting from the extension H, and provided with a nut R at the other side, so that by turning the nut one way the section or segment H' will be turned in the arc of a circle or adjusted relative to the section or segment H to shorten the charging chamber I, and thus enable the period during which the dough is in frictional contact with the drum C, to be regulated. Or by turning the nut R the reverse way, the segment H' is left free to turn back again. A similar result can be obtained by forming the axial portion S' of one of the wings S with worm teeth T into which meshes the worm U secured to the shaft V journaled in fixed bearings, so that by turning the hand wheel W, the segment is regulated up or down.

It is sometimes found that the dough portions when extruded from the cells, are somewhat slow or lazy in discharging, owing to some of them sticking to the plungers F, and others dropping off more quickly. This causes a non-uniform spacing of the pieces on the delivery belt. We obviate this by causing each plunger to extrude the portion of dough from a cell by a quick or rapid movement, so that the impetus given to the dough portion will carry it onward, and cause it to detach itself from the plunger. And as a further means for securing the removal of the extruded dough and the transfer to the usual conveyer belt, we provide a moving scraping blade, or a moving roller operating in a direction opposite to the rotation of the drum or revolving in a uniform position. By these means we obtain a positive removal of the dough pieces instead of depending upon their dropping off the plungers, and we thereby insure a uniform spacing of the pieces on the delivery belt. Figs. 2 and 3 show diagrammatically a practical embodiment of this idea, in which C is the drum having side flanges D and provided with cells E for the dough. G is the cam race to control and adjust the position of the plunger in each cell, and against this cam the plunger rods bear. A portion G' of this cam race is jointed at a, so that its curve can be varied to operate the plungers with greater quickness or rapidity at the exact moment required. For this purpose the portion G' is coupled to the rod of an eccentric b rotated by a shaft c, which is driven by means of the gear wheels d, whose rotation is obtained from the shaft L, this being the shaft which rotates the drum C. The gear wheels in the drawing are so proportioned as to thrust the cam piece outward four times, to each rotation of the drum. The eccentric is so adjusted on its counter-shaft c, that at the proper moments it thrusts a portion G' of the cam race outward, with a rapid movement, into the position shown by the dotted lines, and so thrusts the particular plunger that is in contact with it outward rapidly to extrude the dough, and the impetus thus given to the dough, will carry it onward clear of the plunger. The portion G' is almost immediately drawn back into the position shown by the full lines, and leaves the plunger free to slide inward. This operation, when there are four cells in the drum, takes place four times to each revolution of the drum. e is a scraping blade adapted to reciprocate in the arc of a circle by means of a second eccentric f, rotated by the shaft c. This blade is secured to a radius arm g mounted upon the shaft L, so as to swing to and fro in a circular arc by means of the eccentric, to which it is coupled by the rod h, and the eccentric is so adjusted that at the proper moment it imparts a throw to the scraper in the opposite direction to the rotation of the drum, and so the scraper shears or wipes the dough off the plunger. This is a further means of securing a positive removal of the dough. The scraper edge is in close proximity to the drum surface.

If the scraping blade should be regarded as too harsh a means of removing the dough pieces, we rotatably mount a roller j on the arm g, the roller being of such width that it fits between the flanges of the drum, and in close proximity to the drum surface. It is provided with a pinion k gearing in a stationary rack l in such a manner that when the arm g oscillates in an opposite direction to the rotation of the drum, the roller j rotates in the opposite direction to the drum rotation, and wipes the dough piece off, thus insuring its positive removal. In both cases shown in the drawings the blade e and the roller j swing four times for each rotation of the drum. If the roller revolves in a uniform position it preferably revolves in a direction opposite to that of the drum, and no oscillation of the roller is employed.

We declare that what we claim is:—

1. In a machine for dividing and molding dough and other plastic material having in combination a rotary drum with cells therein, a hopper, a curved stepped extension at side of hopper which in conjunction with the drum forms a concentric chamber, said extension being made in sections or segments rendered adjustable relative to each other so as to lengthen or shorten the charging chamber, and each section spaced nearer to the drum than the preceding one.

2. In a machine for dividing and molding dough and other plastic material, the combination with the sections or segmental walls of the charging chamber of a screwed spindle hinged to one of the sections, a shoulder or flange projecting from another section through which the screwed spindle passes, and a nut screwed on the spindle and abutting against the said flange, whereby by turning the nut one way the length of the charging chamber is shortened, or by turning it the other way the said chamber can be lengthened.

3. In a machine for dividing and molding dough and other plastic material, having a charging chamber whose wall is made in curved sections or segments, the combination with the movable segments of wing pieces mounted axially on the drum shaft so as to support the movable segments in contact with the drum surface, and enable them to turn in the arc of a circle concentric with the drum.

4. In a machine for dividing and molding dough and other plastic material, a rotatable drum having cells, plungers carried by said drum and operating in said cells, a cam race to control and adjust the position of the plunger in each cell, a portion of which is jointed so that its curve can be varied, and means for thrusting this portion outward at the proper moments, with a rapid movement so as to thrust the particular plunger that is in contact with it outward rapidly to extrude the dough.

5. In a machine for dividing and molding dough and other plastic material, a rotatable drum having cells, plungers carried by the drum and operating in said cells, a scraper blade mounted on a radius arm in close proximity to the drum surface, and cooperating with the latter to scrape or wipe off the extruded dough and means for oscillating said scraper blade.

In witness whereof, we have hereunto signed our names this 13th day of July 1911, in the presence of two subscribing witnesses.

JOHN CALLOW.
HERSCHEL LIVINGSTONE CALLOW.

Witnesses:
C. P. LIDDON,
P. W. WILLIAMS.